(12) United States Patent
Medina-Garcia

(10) Patent No.: US 9,059,637 B2
(45) Date of Patent: Jun. 16, 2015

(54) SYSTEM AND METHOD FOR CALIBRATING A POWER SUPPLY

(71) Applicant: Infineon Technologies Austria AG, Villach (AT)

(72) Inventor: Alfredo Medina-Garcia, Munich (DE)

(73) Assignee: Infineon Technologies Austria AG, Villach (AT)

( * ) Notice: Subject to any disclaimer, the term of this patent is extended or adjusted under 35 U.S.C. 154(b) by 149 days.

(21) Appl. No.: 13/800,073

(22) Filed: Mar. 13, 2013

(65) Prior Publication Data

US 2014/0268950 A1  Sep. 18, 2014

(51) Int. Cl.
*H02M 3/335* (2006.01)
*H02M 1/00* (2006.01)

(52) U.S. Cl.
CPC ...... *H02M 3/33507* (2013.01); *H02M 3/33523* (2013.01); *H02M 2001/0025* (2013.01)

(58) Field of Classification Search
USPC .................... 363/21.12, 74, 78, 79
See application file for complete search history.

(56) References Cited

U.S. PATENT DOCUMENTS

| 6,344,981 | B1 | 2/2002 | Norton, Jr. et al. | |
|---|---|---|---|---|
| 2010/0315840 | A1 | 12/2010 | Cohen | |
| 2010/0315841 | A1 * | 12/2010 | Saji | 363/21.12 |
| 2012/0281438 | A1 * | 11/2012 | Fang et al. | 363/21.12 |
| 2013/0064566 | A1 * | 3/2013 | Kojima | 399/88 |
| 2013/0294118 | A1 * | 11/2013 | So et al. | 363/21.16 |

\* cited by examiner

*Primary Examiner* — Emily P Pham
(74) *Attorney, Agent, or Firm* — Slater & Matsil, L.L.P.

(57) ABSTRACT

In accordance with an embodiment, a method of calibrating a power supply includes coupling a reference load to an output of the power supply, setting an output voltage of the power supply to a first output voltage, measuring a current delivered to the reference load, and determining a current metric based on the measuring. The output voltage of the power supply is increased until the determined current metric crosses a first threshold, which occurs when the output of the power supply is at a second output voltage, and the power supply it set to operate at the second output voltage.

20 Claims, 11 Drawing Sheets

US 9,059,637 B2

SYSTEM AND METHOD FOR CALIBRATING A POWER SUPPLY

TECHNICAL FIELD

This invention relates generally to semiconductor circuits and methods, and more particularly to a system and method for calibrating a power supply.

BACKGROUND

Switched mode power supply systems are used for a wide range of applications from simple AC to DC converters used for power consumer products, such as computers and audio appliances, to high power converter systems used to provide power to electric cars and rack mounted premises equipment used in large computer and communication network facilities. In higher power switched mode power supplies, such as those used to power communication equipment, there is often a requirement that the input and output power ports are galvanically isolated in order to facilitate operation across more than one power supply domain and to prevent injury due to high currents in ground loops.

As many switched mode power supplies provide a regulated output, a voltage and/or current feedback path is often used. In order to maintain galvanic isolation, however, this feedback path is also galvanically isolated via isolation transformers and optocouplers. For example, in some systems, the output voltage of the switched mode power supply is converted to a light intensity in the output power domain using a light emitting diode (LED). This light intensity is received in the input power domain via a photodiode, the output of which is used to derive an error signal for the voltage control loop. In very low cost, high volume consumer applications, however, the existence of optocouplers and isolation transformers in the feedback path add extra cost and consume board space. Even in systems that do not require galvanic isolation, components needed to facilitate voltage and/or current feedback may also add cost and/or board space to the system.

SUMMARY OF THE INVENTION

In accordance with an embodiment, a method of calibrating a power supply includes coupling a reference load to an output of the power supply, setting an output voltage of the power supply to a first output voltage, measuring a current delivered to the reference load, and determining a current metric based on the measuring. The output voltage of the power supply is increased until the determined current metric crosses a first threshold, which occurs when the output of the power supply is at a second output voltage, and the power supply it set to operate at the second output voltage.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a system and method for calibration method of a power supply. In particular, embodiments utilizing flyback power supply architectures are described. The invention may also be applied, however, to other switched-mode power supply topologies, and to other types of types of circuits, systems, and methods used for power conversion and communication, and/or systems that normally utilize galvanically isolated feedback and/or systems that are digitally controlled.

In embodiments of the present invention, a feedback signal for switched mode power converter is derived using indirect methods. For example, in order to derive an output voltage of the switched mode power converter, timing information of the pulse width modulated signal provided to the power converter switching transistor is analyzed, and an estimated output voltage is derived. Similarly, in embodiment power converters that are configured to output a constant current, and output current is estimated using timing information of the pulse width modulated signal supplied to the switching transistor in the switched mode power converter.

Figure 1A:
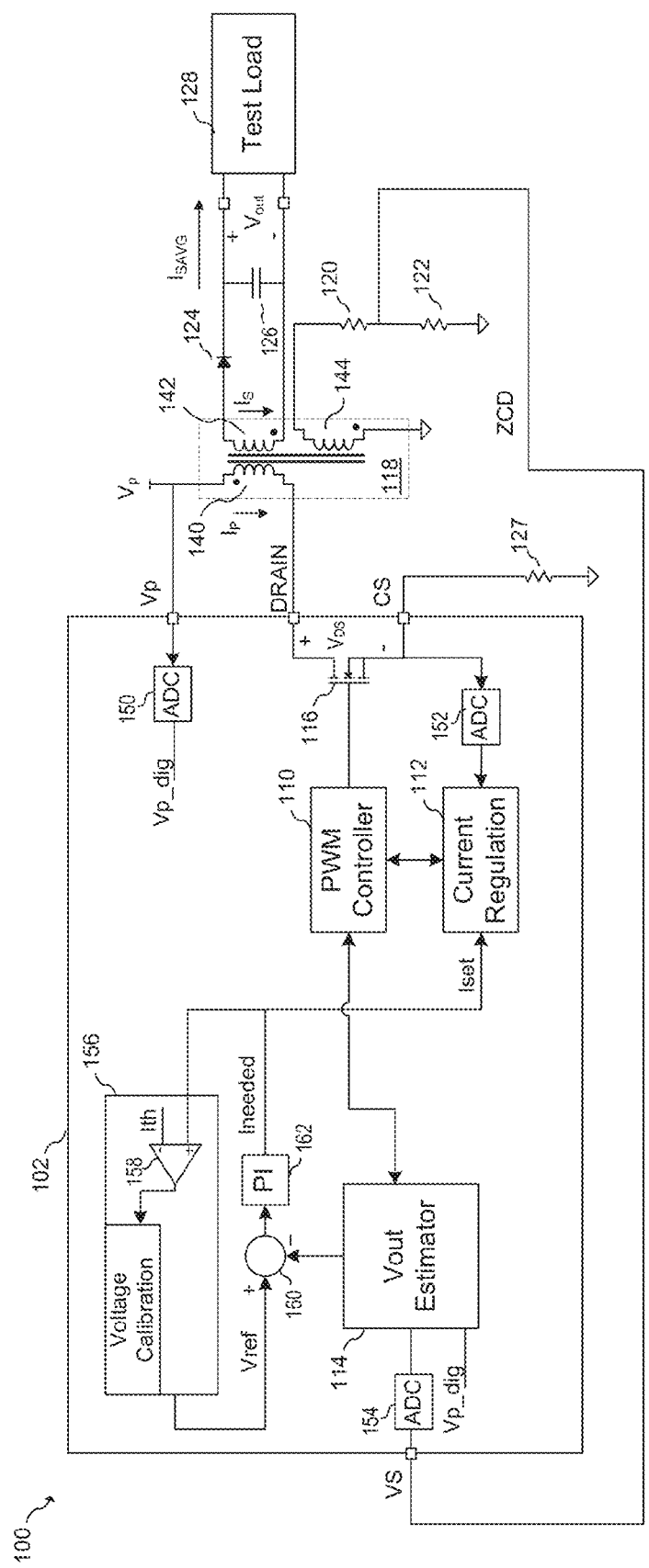
FIGS. 1a-d illustrate an embodiment power supply circuit and associated waveform graphs.

FIG. 1a illustrates embodiment power converter system 100, which is configured as a flyback converter having a calibrated constant voltage output. It should be understood, that in alternative embodiments, other power converter topologies may be used. Power converter 100 includes power converter control integrated circuit 102 coupled to transformer 118. Rectifying diode 124 is coupled to the secondary winding of transformer 118. Output capacitance 126 is used to reduce output voltage ripple. Transformer 118 includes a primary winding 140, a secondary winding 142, and auxiliary winding 144 that is used to detect zero crossings of secondary current $I_S$. As shown, the turns ratio of the primary winding to the secondary winding is n:1.

Integrated circuit 102 includes switching transistor 116 having a gate terminal coupled to the output of pulse width modulator (PWM) controller 110. Current regulation circuit 112 provides feedback information from current sensing resistor 127 that is coupled to the source of switching transistor 116. Output voltage estimation block 114 estimates the output voltage $V_{OUT}$, from which current error signal $I_{needed}$ is derived. In an embodiment $V_{OUT}$ is estimated based on timing information from PWM controller 110, primary side voltage $V_P$ applied to transformer 118 and, and signal ZCD coupled from winding 114 of transformer 118. Voltage calibration block 156 determines Vref from which the output of voltage estimator block 114 is subtracted via subtraction block 160 and processed with proportional-integral (PI) controller block 162 to produce $I_{needed}$, which is used by current regulation block 112 as a current control input.

Voltage calibration block 156 includes comparator 158 that compares current error signal $I_{needed}$ with current threshold Ith. In some embodiments, voltage calibration block sets reference voltage signal Vref to correspond to the voltage at which $I_{needed}$ crosses threshold Ith. Voltage calibration block 156 is used in conjunction with test load 128 to calibrate output voltage setting Vref during operation of integrated circuit 102, as will be explained in embodiments below. For example, in some embodiments, voltage calibration block 156 increments Vref until $I_{needed}$ crosses threshold Ith as indicated by comparator 156. Once threshold Ith is crossed, the corresponding Vref is stored in memory and used as signal Vref during subsequent operation of the power converter. Analog to digital converters (ADC) 150, 152 and 154 may be used to convert the voltages at pins Vp, CS and VS to the digital domain. In such embodiments, the operation of voltage calibration block 156, voltage estimator 114, subtraction block 160, PI controller 162 and current regulation block 112 are performed in the digital domain using, for example, a microcontroller, dedicated logic or other digital hardware known in the art. Alternatively, ADC blocks 150, 152 and 154 may be omitted and processing may be performed in the analog domain. In some embodiments, converter IC 103 may also be configurable to support the functionality of converter IC 102 described above with respect to FIG. 1a.

Figure 1B:
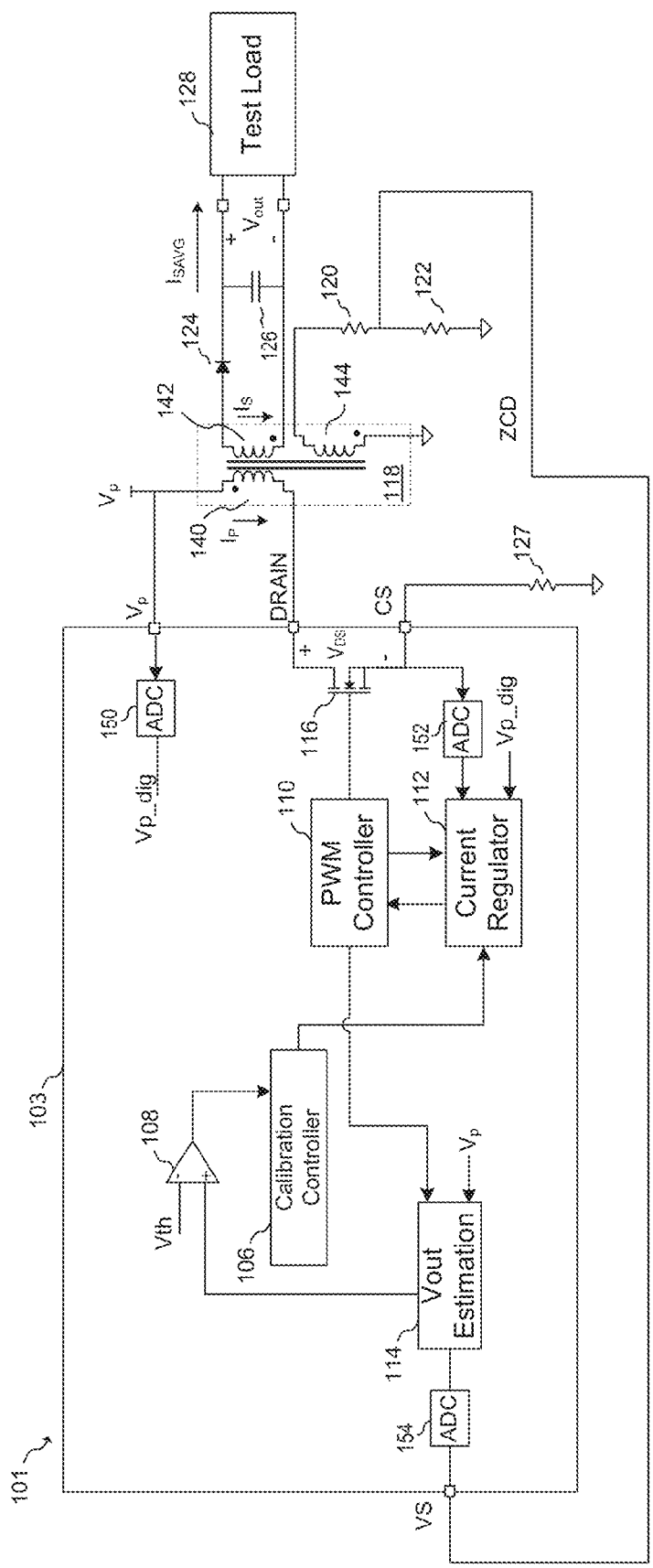

FIG. 1b illustrates embodiment power converter system 101 including converter IC 103, which is configured as a flyback converter having a calibrated constant current output. In an embodiment, calibration controller 106 increments set current $I_{set}$ during calibration. When the output of Vout estimation block 114 exceeds threshold Vth using comparator 108, calibration controller 106 may store the corresponding value for $I_{set}$ in memory and use the stored value for $I_{set}$ during subsequent operation. Similar to the case of FIG. 1a, the operation of calibration block 106, voltage estimator 114, and current regulation block 112 may be performed either in the analog or in the digital domain. In some embodiments, converter IC 103 may also be configurable to support the functionality of converter IC 102 described above with respect to FIG. 1a.

Figure 1C:
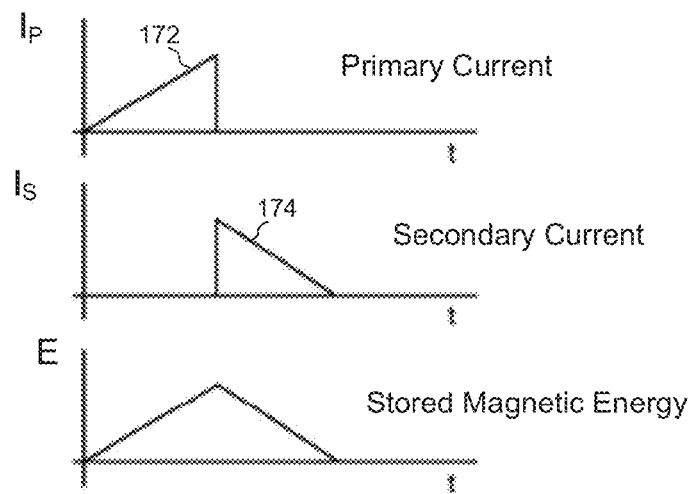

In an embodiment, power converter 100 is operated as a flyback converter in a discontinuous operation mode (DCM). During the on-time of switching transistor 116, current $I_P$ in the primary winding 140 of transformer 118 increases linearly:

$$I_P = \frac{V_P}{L_P}t,$$

where $V_P$ is the voltage applied to primary winding 140, $L_P$ is the inductance of primary winding 140 and t is time. This may be seen graphically as curve 172 in the waveform diagram of FIG. 1c. As shown, primary current $I_P$ increases from zero at time $t_0$ primary peak current $I_{PP}$ at time $t_1$, which may be expressed as:

$$I_{PP} = \frac{V_P}{L_P}t_{on},$$

where $t_{on}=t_1-t_0$. The energy E stored in the magnetic field of the primary winding at time $t_1$ is:

$$E = \frac{1}{2}L_P I_{PP}^2.$$

At time $t_1$, switching transistor 116 is turned-off, and transformer 118 releases stored energy E by increasing the voltage on each winding, proportional to the number of turns of each winding, until current starts to flow in one of the windings. Under ideal conditions, all of the energy E stored in primary winding 140 will be released by secondary winding 142. Assuming a constant secondary voltage, secondary current $I_S$ will decrease linearly from time $t_1$ to time $t_2$ until secondary current $I_S$ reaches zero, as shown in curve 174 of FIG. 1c. In the ideal case assuming perfect coupling, secondary inductance $L_S$ is:

$$L_S = \frac{L_P}{n^2},$$

where n is the turns ratio of the number of primary windings to the number of secondary windings. It should be understood, however, that in the embodiment illustrated in FIG. 1a, some energy is released though auxiliary winding 144. Secondary peak current $I_{SP}$ may be expressed as:

$$E = \frac{1}{2}L_P I_{PP}^2 = \frac{1}{2}L_S I_{SP}^2 = \frac{1}{2}\frac{L_P}{n^2}I_{SP}^2 \rightarrow I_{SP} = nI_{PP}.$$

The time $t_d=t_2-t_1$ that it takes to discharge secondary winding 144 may be derived from the following expression for secondary current $I_s$:

$$I_S = \frac{V_S}{L_S}t,$$

where $V_S$ is the voltage of the secondary winding. The above expression yields:

$$t_d = \frac{I_{SP}L_S}{V_S} = \frac{nI_{PP}L_S}{V_S} = \frac{I_{PP}L_P}{nV_S}.$$

by using the expression $$I_{PP} = \frac{V_P}{L_P}t_{on},$$

$t_d$ may be expressed as:

$$t_d = \frac{V_P}{nV_S}t_{on}.$$

Figure 1D:
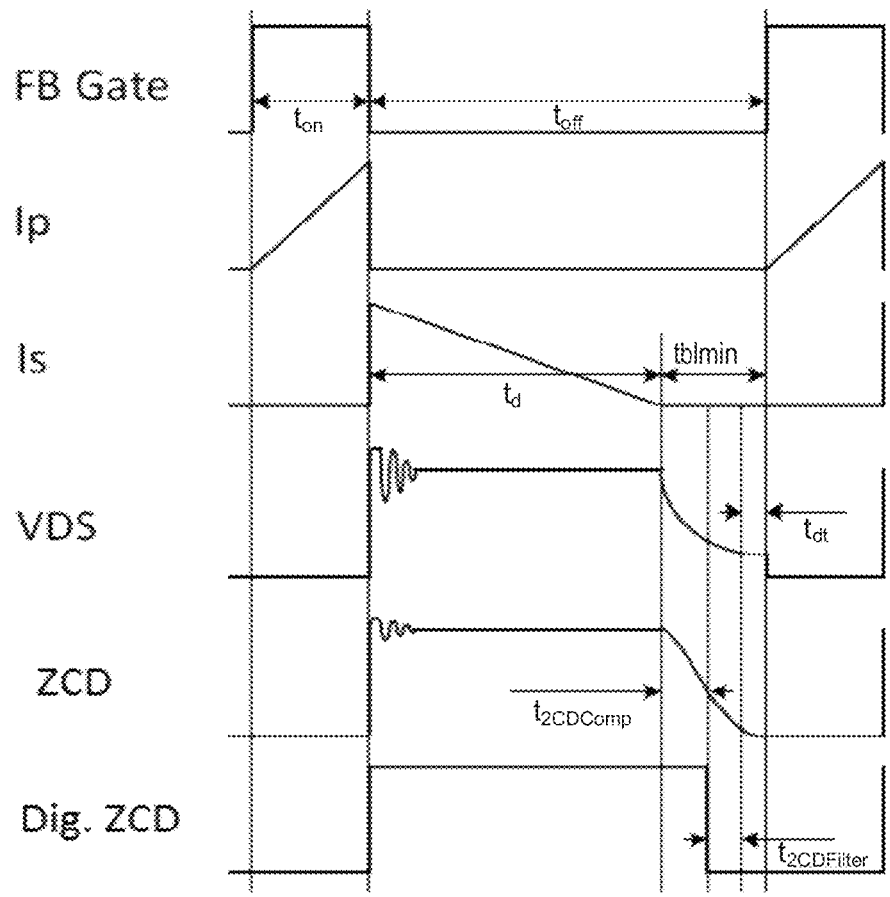

FIG. 1d illustrates a waveform diagram illustrating the operation of converter 100. As shown, when gate voltage FB Gate goes high, current $I_P$ starts to linearly increase for the duration of time $t_{on}$, at the end of which gate voltage FB Gate goes low and gate-source voltage of switching transistor 116 is driven high. Next, secondary current $I_S$ linearly decreases to zero during time period $t_d$. Once current $I_S$ is zero, zero crossing signal ZCD emanating from auxiliary winding 144 goes low. In some embodiments, signal ZCD is derived via a resistor divider including resistors 120 and 122. Digitized version of ZCD, Dig. ZCD, which may be generated by passing signal ZCD through a comparator or logic gate (not shown), is also illustrated in FIG. 1d. When converter 100 is operating in a DCM mode, there is a delay of $t_{blmin}$ from the time that current $I_S$ reaches zero and signal FB Gate is re-asserted.

Based on the above expressions, an average current $I_{savg}$ may be derived for a given $t_{on}$:

$$I_{savg} = \frac{I_{SP}}{2} \frac{t_d}{t_{on} + t_d + t_{blmin}} = I_{PP} \frac{n}{2} \frac{t_d}{t_{fb}}$$

$$I_{savg} = t_{on} \frac{V_P}{L_P} \frac{n}{2} \frac{t_d}{t_{fb}},$$

where $t_{fb}$ is the flyback period of the switching converter. In embodiments of the present invention, the above expression for $I_{savg}$ may be used to determine the average output current of a switched mode power converter. $I_{savg}$ may be further passed to the current regulator block and be used to determine $t_{on}$. In embodiments that use a constant $t_{on}$, a relative value for $$\frac{t_d}{t_{fb}}$$

may be derived without the additional scaling factors for simplicity of calculation. In an embodiment, $L_P$ is estimated based on the following formula:

$$L_P = \frac{V_P t_{on}}{I_{PP}},$$

where the values of the shunt resistor 127 in FIGS. 1a and 1b, is assumed to be 1.

The secondary output voltage $V_S$ may be further estimated. Given that:

$$t_d = \frac{V_P}{n V_S} t_{on},$$

it follows that:

$$V_S = V_P \frac{t_{on}}{n t_d}.$$

It should be appreciated that the above expression for $V_S$ is valid in critical conduction mode (CrCM), and in DCM. In an alternative embodiment, $V_S$ may be further indirectly measured by providing an extra winding (not shown) to transformer 118. In such an embodiment, the output voltage of the extra winding will be $mV_S$, where m is the turns ratio of the extra winding to the secondary winding.

It should be appreciated that in some embodiments of the present invention, the above mathematical expressions for average secondary current $I_{savg}$ and secondary output voltage $V_S$ assumes ideal coupling conditions and accurate knowledge of component values. In real systems, however, coupling is lossy and non-ideal, and component values may vary from part to part. Hence, the above expressions for average secondary current $I_{savg}$ and secondary output voltage $V_S$ may be used to provide estimates of the feedback signals. For more accurate control of the output voltage and current of the power supply, however, embodiments of the present invention calibrate the switched mode power supply such that embodiment methods of output voltage and current estimation may be used. In embodiments, average secondary current $I_{savg}$ and secondary output voltage $V_S$ are calculated using digital and analog circuits and systems known in the art. For example, a microcontroller may be used to perform the calculation. In an embodiment secondary output voltage $V_S$ may be estimated by according to the following expression:

$$V_S = V_P \frac{t_{on}}{n t_d},$$

where the value $t_{on}$ is calculated prior to the determination of the above expression for $V_S$.

Figure 2A:
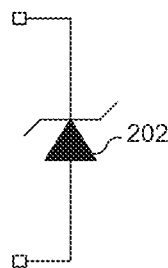
FIGS. 2a-g illustrate an embodiment test load and associated DC transfer characteristics.
Figure 2B:
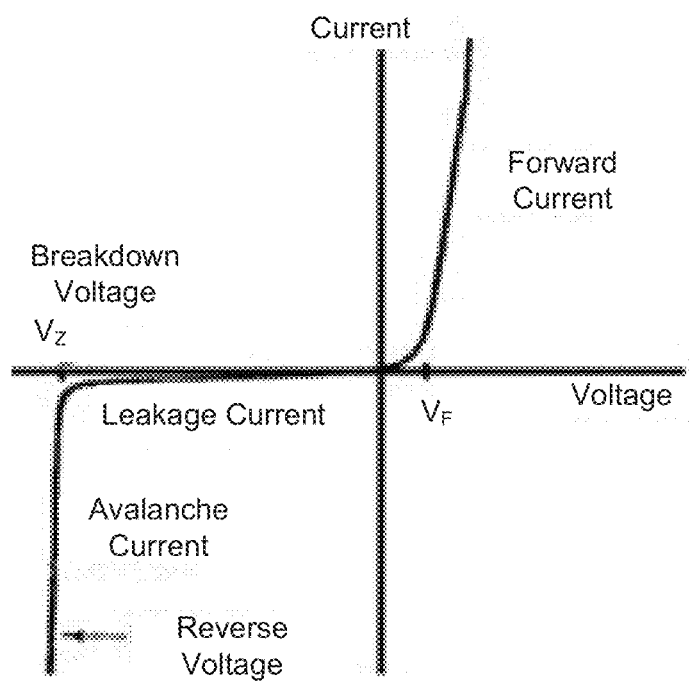

In an embodiment of the present invention, calibration of the estimated average secondary current $I_{savg}$ or secondary output voltage $V_S$ is achieved by coupling test load 128 to the output of the power converter as shown in FIG. 1a. Test load 128 has a current to voltage relationship used by the power supply controller 102 to calibrate itself. In one embodiment, test load 128 may be implemented using Zener diode 202 as shown in FIG. 2a. FIG. 2b illustrates an IV curve showing the relationship between the current and applied voltage to Zener diode 202. As can be seen, the current increases according to voltage in the forward direction starting at voltage $V_F$, and increases starting at Zener voltage $V_Z$ as a reverse voltage is applied. In an embodiment calibration procedure, power supply integrated circuit 102 increases its output voltage starting from a minimum output voltage up until an increase in current is detected using, for example, the expression for $I_{savg}$ described above. Once the power supply integrated circuit 102 detects the increase in current, the output voltage setting during which the increase in voltage is detected, is used as a calibrated output voltage of about $V_Z$ for the case of zener diode 202 shown in FIG. 2b.

Figure 2C:
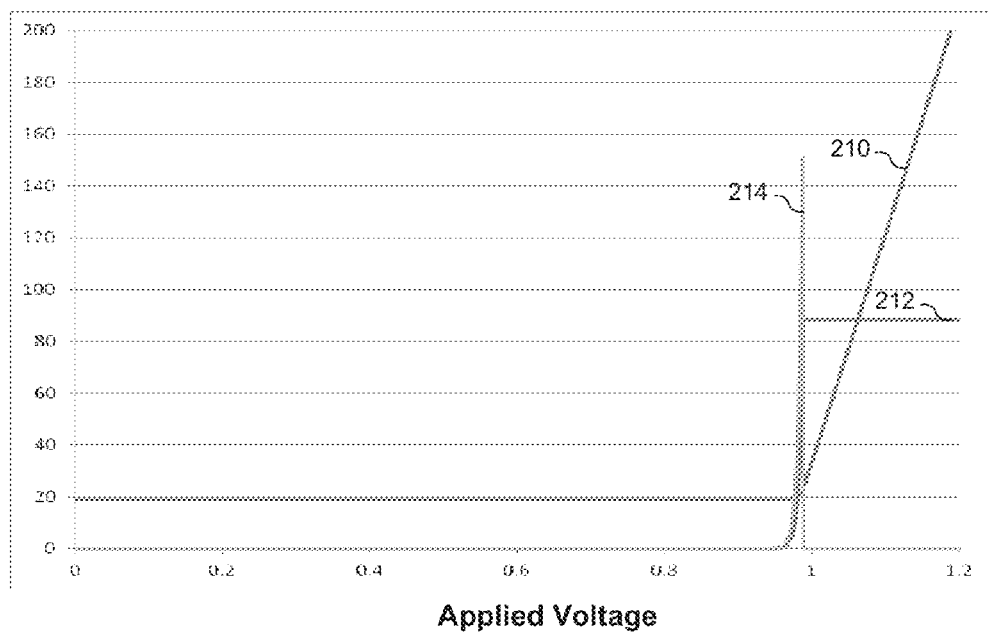
Figure 2D:
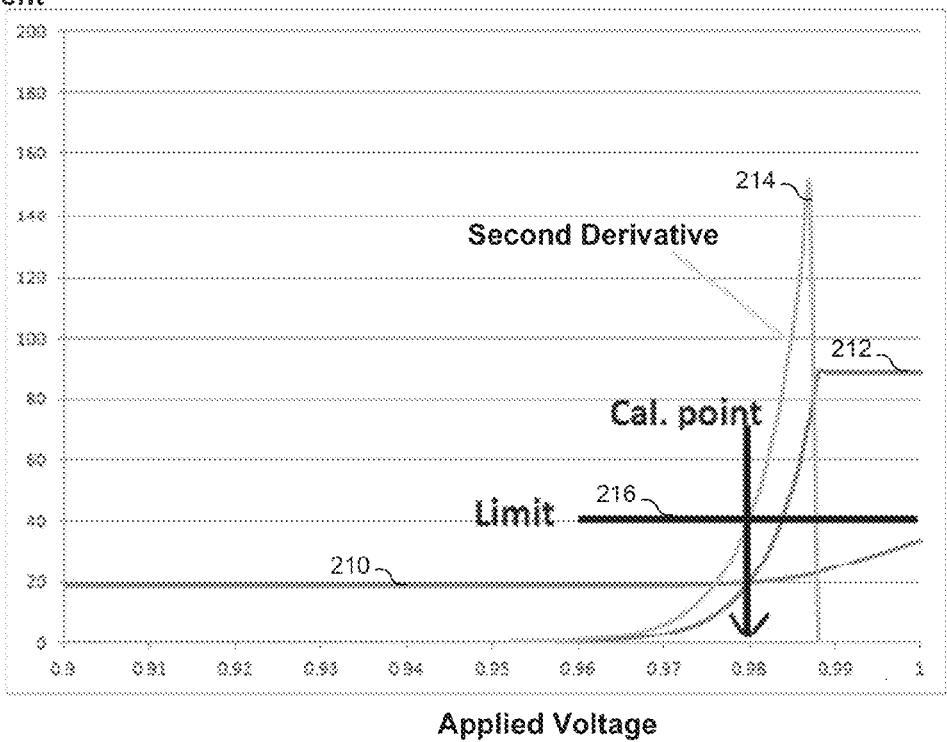

In an embodiment, the determination of when the detected current increases is made by comparing the estimated current value, or a filtered estimated current value with a threshold. A filtered estimated current value may be used, for example, in situations where the IV response of the load is gradual, lacks sharpness and/or has a low slope. In one embodiment, the estimated current value is filtered by taking the second derivative of the estimated current with respect to the power supply output voltage. FIG. 2c illustrates trace 210 of estimated current v. normalized applied voltage for a zener diode. The applied voltage is normalized such that the desired output voltage occurs at V=1.0 on the x-axis. Traces 212 and 214 are the first and second derivatives of trace 210, respectively. It can be seen that second derivative curve 214 has a sharp response at V=1.0. This sharp response may be used to increase the accuracy of the estimated current comparison in some embodiments, especially for test loads that do not have a sharp I-V response at the desired calibrated output voltage. FIG. 2d illustrates traces 210, 212 and 214 over a smaller section of the x-axis. In an embodiment, second derivative 214 is compared to limit 216. As illustrated, the calibration point for the power supply is at V=0.98. It should be appreciated that the calibration point illustrated in FIG. 2d is just one of many examples of an embodiment calibration curve.

Figure 2E:
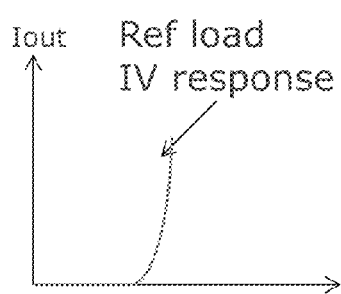
Figure 2F:
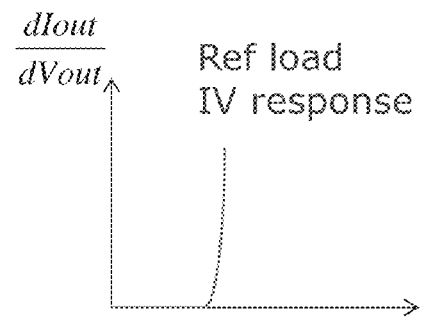
Figure 2G:
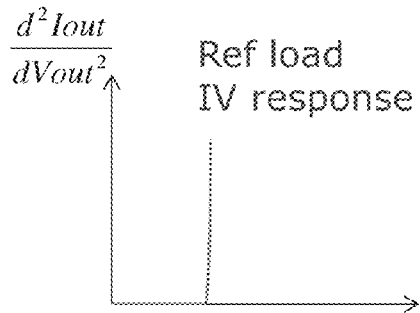

FIG. 2e illustrates an embodiment reference load I-V response, FIG. 2f illustrates a first derivative of the reference load I-V response of FIG. 2e, and FIG. 2g illustrates a second derivative of reference load I-V response of FIG. 2e. It can be seen how using the second derivative may be used to "sharpen" the IV response of an otherwise smooth or gradual IV response. In some embodiments, further successive derivatives may be used beyond the second derivative. Each derivative may be calculated, for example, in the analog domain using differentiators, or in the digital domain using digital filtering techniques known in the art.

Figure 3A:
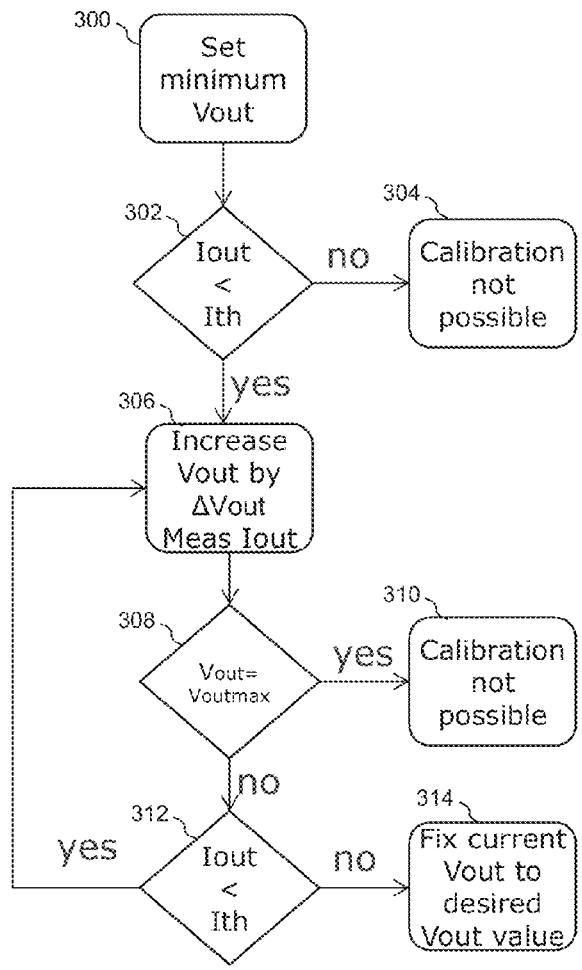
FIGS. 3a-c illustrate embodiment methods.

FIG. 3a illustrates an embodiment calibration method that may be implemented, for example, by calibration controller 106 shown in FIG. 1a. In some embodiments, the method of FIG. 3a may be used along with a reference load having a sharp IV response to calibrate a constant voltage power supply. In step 300, the output voltage of the power converter 100 is set to a minimum output voltage setting. Next, in step 302, estimated current Iout is compared with a threshold current Ith. This step may be implemented, for example, in the digital domain as well as the analog domain depending on the particular embodiment. If current Iout is not less than threshold current Ith, the calibration procedure ends in step 304 as not being possible to calibrate. This condition may be due to factors including, but not limited to, bad contacts and/or connections to calibration load, and a high noise environment that may lead to system errors.

If, on the other hand, current Iout is less than threshold current Ith, output voltage Vout is increased by Δvout, and the Iout is once again measured/estimated. If, in step 308, Vout is at a maximum output voltage, then the calibration procedure ends at step 310, which is an indication that desired output voltage is beyond the range of the power supply. This condition may also occur if the test load is not functioning correctly or is not connected.

Next, in step 312, estimated current Iout is compared with threshold current Ith in a similar as step 302. If estimated current Iout is less than threshold Ith, then output voltage Vout is again incremented by ΔVout. On the other hand, if estimated current Iout is greater than threshold Ith, output voltage Vout is fixed or calibrated to the current Vout setting, for example, by writing a flash or e-fuses, in step 314. In some embodiments, step 314 is implemented by storing the input code to D/A converter 104 in memory.

Figure 3B:
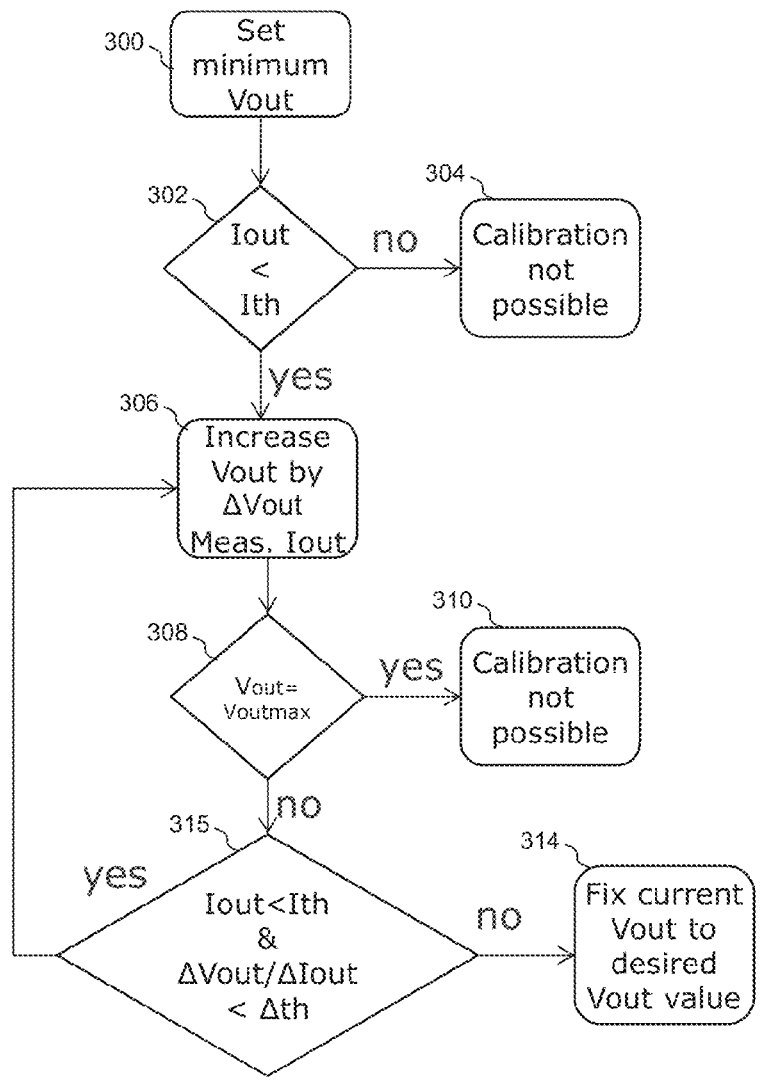

In embodiments, the method illustrated in FIG. 3a may be used with test loads having a "sharp" IV response, such as responses that are sharpened by taking successive derivatives or sharp responses that are sharp by nature of the architecture of the test load. In embodiments in which the IV response is more gradual, an additional condition may be applied to step 315, as shown in the method of FIG. 3b. In addition to checking whether Iout is less than threshold current Ith, the change in output voltage v. the change in output current, ΔVout/ΔIout is also checked at this point. If estimated output current is less than threshold Ith, and if ΔVout/ΔIout is less than threshold ΔVth, then output voltage Vout is increased again by ΔVout in step 306. If, on the other hand, either Iout is greater than threshold current Ith or ΔVout/ΔIout is greater than threshold ΔVth, then the present Vout value is used as a calibrated output value in step 314. By checking ΔVout/ΔIout, an increase in slope may also be used to determine the calibration point.

Figure 3C:
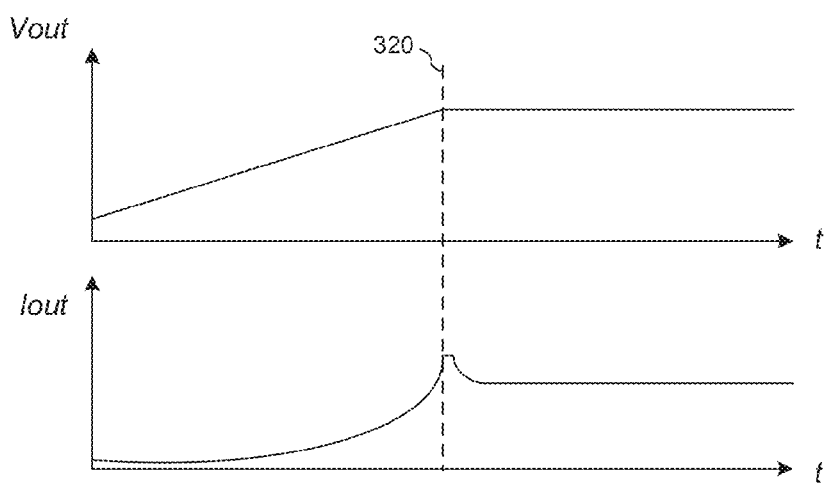

FIG. 3c illustrates waveform diagrams of output voltage Vout and output current Iout versus time during an embodiment calibration procedure. As shown, voltage Vout increases linearly while current Iout increases according the characteristics of the test load. At time 320, the power supply system detects the increased current using, for example, the method illustrated in FIG. 3a. After time 320, the output voltage Vout is set to the value of Vout during the time that the increase in Iout was detected.

Figure 4A:
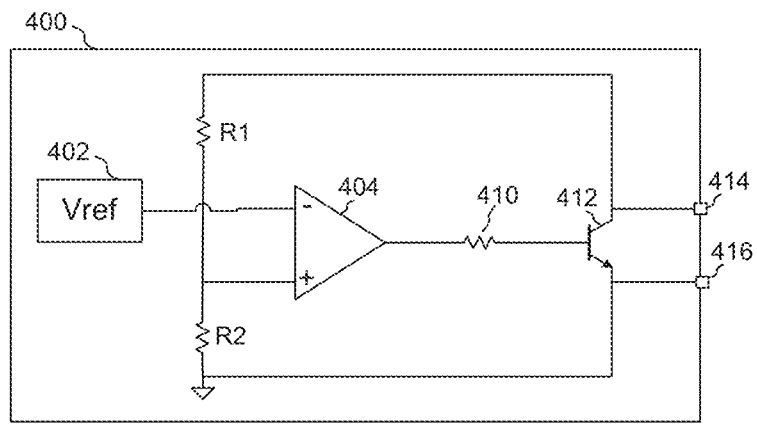
FIGS. 4a-d illustrate embodiment test loads and associated DC response characteristics.

FIG. 4a illustrates test load 400 according to another embodiment of the present invention. Test load 400 includes voltage reference 402, the output of which is coupled to the negative input of amplifier 404. The positive input of amplifier 404 is coupled to the output of the resistor divider constructed of resistors R1 and R2. Output terminals 414 and 416 are configured to be coupled to the output of the power supply being calibrated and its ground terminal connection respectively. In an embodiment, when the voltage difference between terminal 414 and 416 is low, very little current is being drawn by test load 400 because transistor 412 is off.

At low voltages, the output of the resistor divider made of resistors R1 and R2 is below voltage VREF; hence, the output of amplifier 404 is low, thereby turning off transistor 412. As the voltage across terminals 414 and 416 approach a desired calibration value, the output of the voltage divider made of resistors R1 and R2 is at about Vref. At this point, transistor 412 begins to conduct, and current is drawn through test load 400. As the voltage across terminals 412 and 416 continues to increase, the current will sharply increase and hit a current threshold that defines the calibration point, thereby indicating the calibration point to the system under calibration. The sharper the response is, the higher the accuracy of the determined calibration point. In an embodiment, the calibration voltage the results from using test load 400 is:

$$V_{calibration} = Vref \frac{R1 + R2}{R1}.$$

Figure 4B:
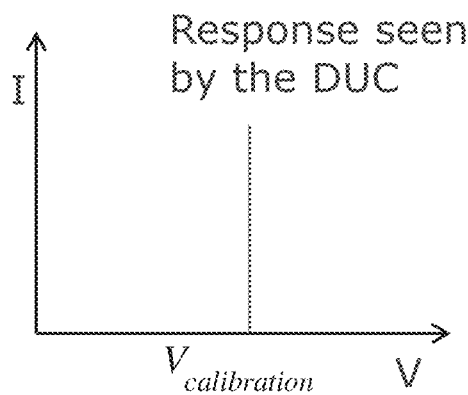

As can be seen the above expression, calibration voltage $V_{calibration}$ may be set using the parameters Vref, R1 and R2. FIG. 4b illustrates an IV curve of test load 400. As can be seen, the IV curve has a sharp peak at about voltage $V_{calibration}$.

Figure 4C:
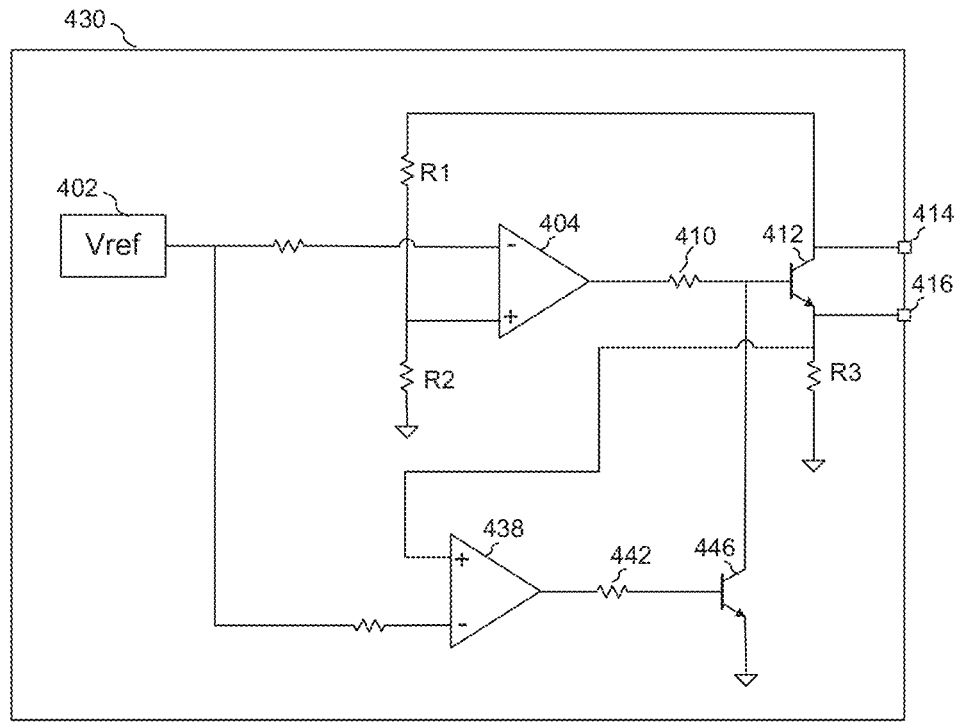
Figure 4D:
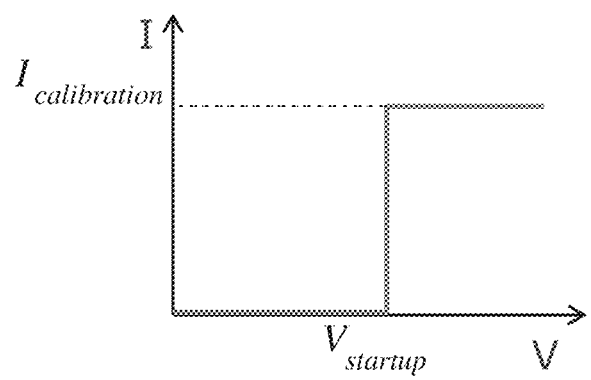

FIG. 4c illustrates test load 430 according to a further embodiment of the present invention. In an embodiment, voltage reference Vref 402, amplifier 404, resistor 410, a resistor divider having resistors R1 and R2, and output transistor 412 operate in a similar manner as test load 400 shown in FIG. 4a with the additional functionality of providing a minimum output voltage drop required by the particular system (i.e., a Flyback converter) to keep operating. Such a voltage may be defined to be:

$$V_{startup} = Vref \frac{R1 + R2}{R1},$$

When the current between terminals 414 and 416 exceed the following expression for the calibrated current:

$$I_{calibration} = \frac{Vref}{R3},$$

the voltage between terminals 414 and 416 will sharply increase since the voltage drop in R3 will be higher than Vref, amplifier 438 will cause transistor 446 to be turned-on via resistor 442, thereby driving transistor 412 off. Such an increase will occur when the current reaches $$\frac{Vref}{R3}.$$

It should be understood that the reference loads described in embodiments herein are just a few examples of many possible embodiment reference loads. The particular IV characteristics and architecture of a particular test load may vary according to the particular embodiment and its specifications.

Figure 5A:
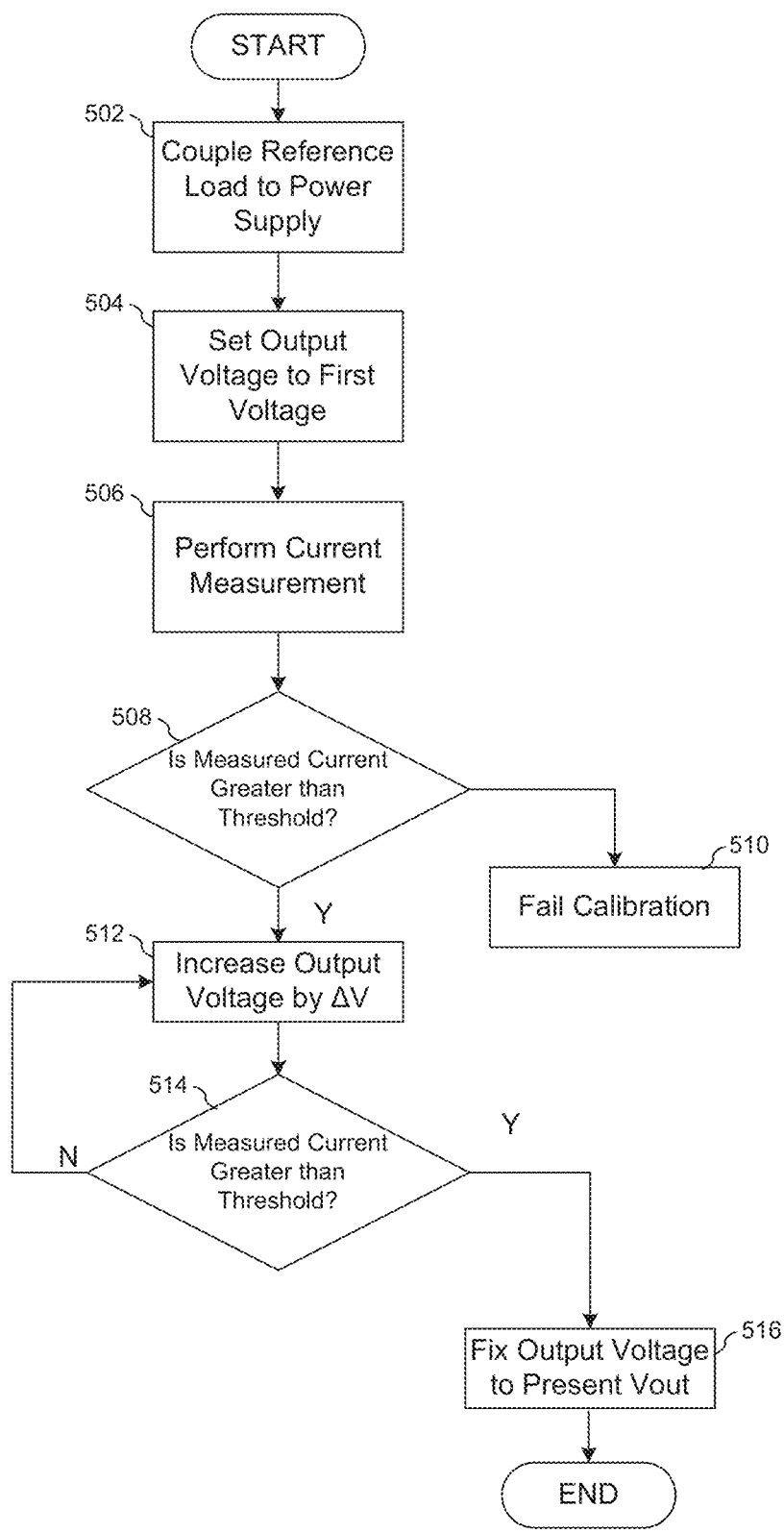
FIGS. 5a-b illustrate further embodiment methods.

FIG. 5a illustrates a method of calibrating a switched mode power supply according to another embodiment of the present invention in which the power supply is configured to operate in a constant voltage mode. In step 502, a reference load is coupled to the power supply. In this step, reference loads described in embodiments herein may be used. Alternatively, other reference loads may be used. In step 504, the output voltage of the power supply is set to a first output voltage. In some embodiments of the present invention, this first output voltage may be a minimum voltage of the power supply that is set using, for example, a digital to analog converter. In other embodiments, the output voltage may be set to other output voltages that are likely to be less than the calibrated threshold. In step 506, a first current measurement is performed. This current measurement may be an indirect current measurement performed using embodiment techniques described above. For example, the indirect current measurement may be an estimate based on the pulse characteristics of the pulse width modulated signal used to drive the switching transistor within the power supply system.

In step 508, the current measurement performed in step 506 is compared to a threshold. If this current is greater than the threshold at this point, the calibration processes is halted and/or failed in step 510. If the current measurement is not greater than the threshold, the output voltage of the power supply is increased by ΔV in step 512. ΔV may correspond, for example, to the least significant bit of a digital word used to produce the internal reference voltage signal. Alternatively, other incremental voltages signal types may be selected according to the particular embodiment and its specifications. For example, in some embodiments, the internal reference voltage signal may be a digital signal, while in other embodiments; the internal reference voltage signal may be an analog signal.

In step 514, the current measurement is again compared to a threshold. If the current measurement is greater than the threshold, the output voltage is fixed to the present output voltage in step 516 when the power supply is configured to operate in a constant voltage mode. In other words, the present output voltage may be used as a calibrated output voltage. In some embodiments, a digital code used to produce the present output voltage is stored in a memory so that the calibrated voltage may be recalled during subsequent operation. If the measured current is not greater than the threshold, then the output voltage is once again increased by ΔV. Steps 512 and 514 are repeated until the measured current is greater than the threshold.

Figure 5B:
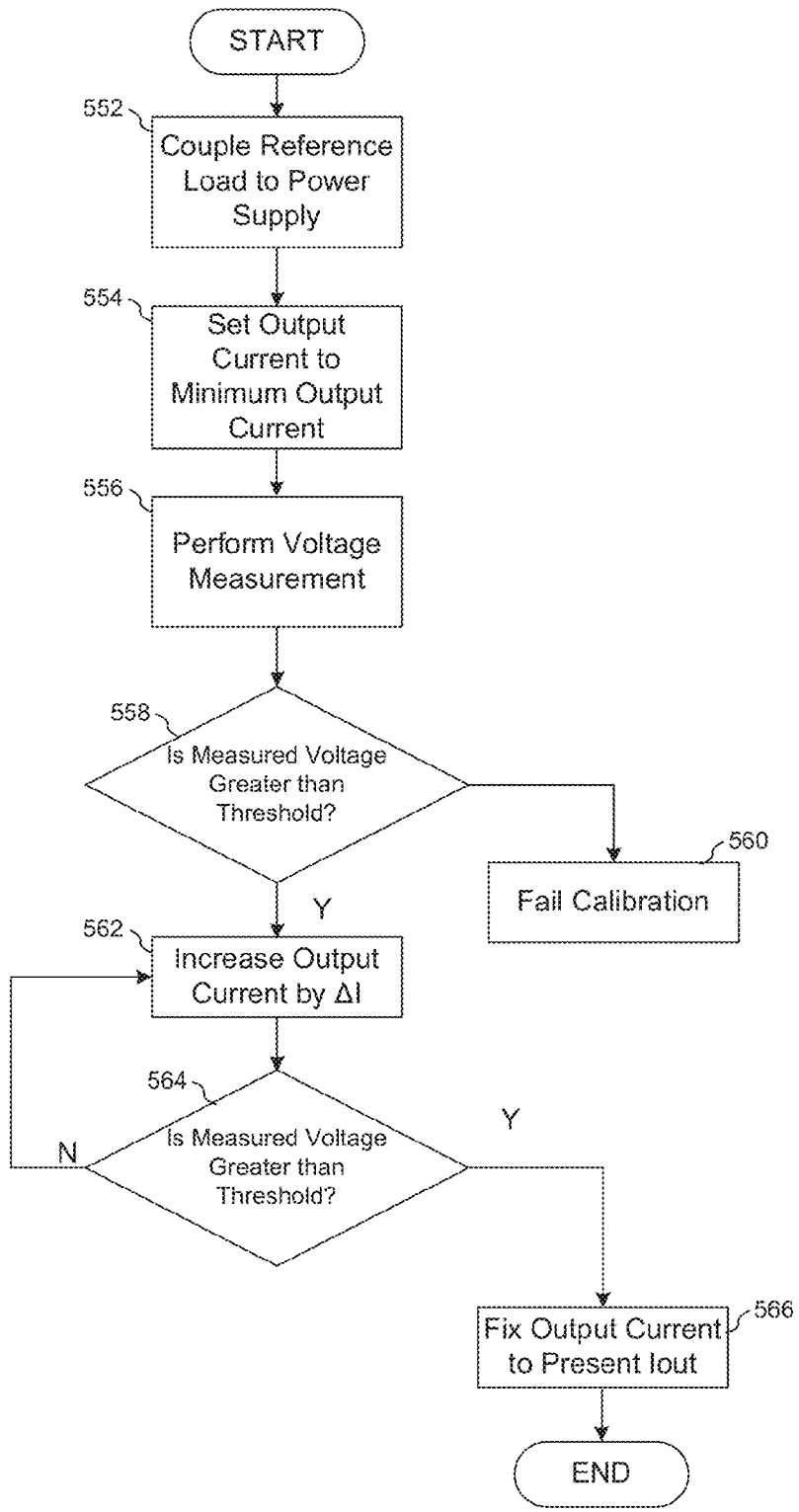

FIG. 5b illustrates a method of calibrating a switched mode power supply according to a further embodiment of the present invention in which the power supply is configured to operate in a constant current mode. In step 552, a reference load is coupled to the power supply. In embodiments, a reference load may be used that provides a voltage response for a specified current. In step 554, the output current of the power supply is set to a first output current. In some embodiments of the present invention, this first output current may be a minimum current of the power supply that is set using, for example, a digital control word. In other embodiments, the output current may be set to other output currents that are likely to be less than the calibrated threshold. In step 556, a first voltage measurement is performed. This voltage measurement may be an indirect voltage measurement performed using embodiment techniques described above.

In step 558, the voltage measurement performed in step 556 is compared to a threshold. If this voltage measurement is greater than the threshold at this point, the calibration processes is halted and/or failed in step 560. If the voltage measurement is not greater than the threshold, the output current of the power supply is increased by ΔI in step 562. ΔI may correspond to, for example, the least significant bit of a digital word used to generate the internal reference current signal. Alternatively, other incremental currents may be selected according to the particular embodiment and its specifications.

In step 564, the voltage measurement is again compared to a threshold. If the voltage measurement is greater than the threshold, the output current is fixed to the present output current in step 566. In other words, the present output current may be used as a calibrated output current. In some embodiments, a digital code used to produce the present output current is stored in a memory so that the calibrated current may be recalled during subsequent operation. If the measured voltage is not greater than the threshold, then the output current is once again increased by ΔI. Steps 562 and 564 are repeated until the measured voltage is greater than the threshold.

In accordance with an embodiment, a method of calibrating a power supply includes coupling a reference load to an output of the power supply, setting an output voltage of the power supply to a first output voltage, measuring a current delivered to the reference load, and determining a current metric based on the measuring. The output voltage of the power supply is increased until the determined current metric crosses a first threshold, which occurs when the output of the power supply is at a second output voltage, and the power supply it set to operate at the second output voltage. The first output voltage may include a minimum output voltage of the power supply.

In an embodiment, determining the current metric includes calculating a second derivative of the measured current with respect to the output voltage of the power supply. In some embodiments, coupling the reference load comprises coupling a zener diode to the output of the power supply.

In an embodiment, measuring the current delivered to the reference load is performed using an indirect current measurement. Performing the indirect current measurement may include determining a length of time of a PWM cycle, determining a secondary current discharge time, and determining a ratio of the secondary current discharge time to the length of time of the PWM cycle. In some embodiments, performing the indirect current measurement further includes determining a value $I_{savg}$ based on the following expression:

$$I_{savg} = \frac{V_p}{L_p} t_{on} \frac{n}{2} \frac{t_d}{t_{fb}},$$

where $I_{savg}$ is an average current in a secondary winding of the power supply, $V_p$ is a voltage applied to a primary winding of the power supply, $L_p$ is an inductance of the primary winding of the power supply, $t_{on}$ is a primary current charging time, n is a turns ratio of the primary winding to the secondary winding, $t_d$ is the secondary current discharge time, and $t_{fb}$ is the length of time of the PWM cycle. The method may further include determining the value $L_p$ based on the following expression:

$$L_p = \frac{V_p t_{on}}{I_{PP}},$$

where $I_{pp}$ is a peak current of the primary winding.

In an embodiment, the method further includes determining whether calibration is not possible. It may be determined that the calibration is not possible when the determined metric does not cross the first threshold for a maximum output of the power supply, or when the determined metric crosses the first threshold at the first output voltage.

In accordance with a further embodiment, a method of calibrating a power supply includes coupling a reference load to an output of the power supply, setting an output current of the power supply to a first output current, measuring a voltage delivered to the reference load, determining a voltage metric based on the measuring. The output current of the power supply is increased until the determined voltage metric crosses a first threshold, which occurs when the output of the power supply is at the second output current, and the power supply is set to operate at the second output current. In an embodiment, determining the voltage metric includes calculating a second derivative of the measured voltage with respect to the output current of the power supply.

In some embodiments, measuring the voltage delivered to the reference load includes performing an indirect voltage measurement. Performing the indirect voltage measurement may include determining a current discharge time though a power supply switching transistor, determining a switch-on time and a switch-off time of the power supply switching transistor, and determining a ratio of the switch-on time to the switch-off time. Performing the indirect voltage measurement may further include determining a value $V_s$ based on the following expression:

$$V_s = V_p \frac{t_{on}}{n t_{off}},$$

where $V_s$ is the voltage delivered to the load, $V_p$ is a voltage applied to a primary winding of the power supply, $L_p$ is an inductance of the primary winding of the power supply, n is a turns ratio of the primary winding of the power supply to a secondary winding of the power supply, $t_{on}$ is the switch-on time and $t_{off}$ is the switch-off time.

In accordance with a further embodiment, a power supply includes a controller having an output driving circuit configured to drive a semiconductor switch, a PWM generator coupled to the output driving circuit, and a calibration circuit configured to calibrate a voltage of an output node of the power supply via a calibration procedure. The calibration circuit includes an output signal estimation circuit configured to indirectly determine an output current of the power supply based on an on-time of the PWM generator, a reference signal generation circuit configured to generate an output voltage control signal of the power supply, and a control circuit configured to increase a magnitude of the output voltage control until an output of the output signal estimation circuit crosses a first threshold, such that the output of the output signal estimation circuit crosses the first threshold when the output voltage control signal is at a first setting. The control circuit is further configured to set the reference signal generation circuit to operate at the first setting during operation of the power supply. The power supply may be implemented using a flyback topology. Alternatively, other topologies may be used.

In an embodiment, the power supply further includes the semiconductor switch that may include a control node coupled to the output driving circuit. The power supply may further include a transformer having a primary winding coupled to an output of the semiconductor switch, and a secondary winding coupled to the output node of the power supply.

In an embodiment, the controller further includes a zero-crossing detection circuit, and the transformer further includes a second secondary winding having an output coupled to a zero-crossing detection circuit. The output signal estimation circuit may further determine the output current based on an output of the zero-crossing detection circuit. In some embodiments, the output signal estimation circuit is further configured to determine a second derivative of the determined output current of the power supply with respect to a setting of the voltage control signal. The output signal estimation circuit may estimate the determined output current delivered to a reference load by determining a ratio of a discharge time of a secondary winding of a transformer of the power supply to a length of time of a cycle of the PWM generator when the reference load is coupled to the power supply.

In accordance with a further embodiment, a power supply includes a controller comprising an output driving circuit configured to drive a semiconductor switch, a PWM generator coupled to the output driving circuit, and a calibration circuit configured to calibrate an output current of the power supply via a calibration procedure. The calibration circuit includes an output signal estimation circuit configured to indirectly determine an output voltage of the power supply based on an on-time of the PWM generator, a reference signal generation circuit configured to generate an output current control signal of the power supply, and a control circuit configured to increase a magnitude of the output current control until an output of the output signal estimation circuit crosses a first threshold. The output of the output signal estimation circuit crosses the first threshold when the output current control signal is at a first setting. The control circuit is further configured to set the reference signal generation circuit to operate at the first setting during operation of the power supply.

An advantage of some embodiments include the ability to provide an accurate output voltage or output current using an internally generated estimate of the output voltage and the output current. In some embodiments, accuracy may be achieved without having to make a precise signal measurement.

Further advantages of some embodiments include the ability to implement a digitally controlled and/or a galvanically isolated power converter having an accurate output voltage or output current using less components dedicated to feedback. As such, some embodiment power supply systems may be smaller and less expensive than some conventional power supply systems.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

What is claimed is:

1. A method of calibrating a power supply, wherein the method comprises:
   coupling a reference load to an output of the power supply;
   setting an output voltage of the power supply to a first output voltage;

measuring a current delivered to the reference load;
determining a second derivative of the measured current with respect to the output voltage of the power supply;
increasing the output voltage of the power supply until the second derivative crosses a first threshold, wherein the determined second derivative crosses the first threshold when the output of the power supply is at a second output voltage; and
setting the power supply to operate at the second output voltage.

2. The method of claim 1, further comprising determining whether calibration is not possible, wherein determining whether calibration is not possible comprises:
determining that calibration is not possible when the second derivative does not cross the first threshold for a maximum output of the power supply; and
determining that calibration is not possible when the second derivative crosses the first threshold at the first output voltage.

3. The method of claim 1, wherein said coupling the reference load comprises coupling a zener diode to the output of the power supply.

4. The method of claim 1, wherein the first output voltage comprises a minimum output voltage of the power supply.

5. The method of claim 1, wherein said measuring the current delivered to the reference load comprises performing an indirect current measurement.

6. The method of claim 5, wherein said performing the indirect current measurement comprises:
determining a length of time of a PWM cycle;
determining a secondary current discharge time; and
determining a ratio of the secondary current discharge time to the length of time of the PWM cycle.

7. The method of claim 6, wherein said performing the indirect current measurement further comprises determining a value $I_{savg}$ based on the following expression:

$$I_{savg} = \frac{V_p}{L_p} t_{on} \frac{n}{2} \frac{t_d}{t_{fb}},$$

where $I_{savg}$ is an average current in a secondary winding of the power supply, $V_p$ is a voltage applied to a primary winding of the power supply, $L_p$ is an inductance of the primary winding of the power supply, $t_{on}$ is a primary current charging time, n is a turns ratio of the primary winding to the secondary winding, $t_d$ is the secondary current discharge time, and $t_{fb}$ is the length of time of the PWM cycle.

8. The method of claim 7, further comprising determining the value $L_p$ based on the following expression:

$$L_p = \frac{V_p t_{on}}{I_{PP}},$$

where $I_{pp}$ is a peak current of the primary winding.

9. A power supply comprising:
a controller comprising:
an output driving circuit configured to drive a semiconductor switch,
a PWM generator coupled to the output driving circuit, and
a calibration circuit configured to calibrate an output current of the power supply via a calibration procedure, wherein the calibration circuit comprises
an output signal estimation circuit configured to indirectly determine an output voltage of the power supply based on an on-time of the PWM generator,
a reference signal generation circuit configured to generate an output current control signal of the power supply, and
a control circuit configured to increase a magnitude of the output current control signal until an output of the output signal estimation circuit crosses a first threshold, wherein the output of the output signal estimation circuit crosses the first threshold when the output current control signal is at a first setting, and set the reference signal generation circuit to operate at the first setting during operation of the power supply.

10. A method of calibrating a power supply, wherein the method comprises:
coupling a reference load to an output of the power supply;
setting an output current of the power supply to a first output current;
measuring a voltage delivered to the reference load;
determining a second derivative of the measured voltage with respect to the output current of the power supply;
increasing the output current of the power supply until the second derivative crosses a first threshold, wherein the determined second derivative crosses the first threshold when the output of the power supply is at a second output current; and
setting the power supply to operate at the second output current.

11. The method of claim 10, wherein said measuring the voltage delivered to the reference load comprises performing an indirect voltage measurement.

12. The method of claim 11, wherein said performing the indirect voltage measurement comprises:
determining a current discharge time though a power supply switching transistor;
determining a switch-on time and a switch-off time of the power supply switching transistor; and
determining a ratio of the switch-on time to the switch-off time.

13. The method of claim 12, wherein said performing the indirect voltage measurement further comprises determining a value $V_s$ based on the following expression:

$$V_s = V_p \frac{t_{on}}{nt_{off}},$$

where $V_s$ is the voltage delivered to the load, $V_p$ is a voltage applied to a primary winding of the power supply, $L_p$ is an inductance of the primary winding of the power supply, n is a turns ratio of the primary winding of the power supply to a secondary winding of the power supply, $t_{on}$ is the switch-on time and $t_{off}$ is the switch-off time.

14. A power supply comprising:
a controller comprising:
an output driving circuit configured to drive a semiconductor switch,
a PWM generator coupled to the output driving circuit, and
a calibration circuit configured to calibrate a voltage of an output node of the power supply via a calibration procedure, wherein the calibration circuit comprises an output signal estimation circuit configured to indirectly determine an output current of the power supply based on an on-time of the PWM generator, a reference signal generation circuit configured to generate an output voltage control signal of the power supply, and a control circuit configured to increase a magnitude of the output voltage control signal until an output of the output signal estimation circuit crosses a first threshold, wherein the output of the output signal estimation circuit crosses the first threshold when the output voltage control signal is at a first setting, and set the reference signal generation circuit to operate at the first setting during operation of the power supply.

15. The power supply of claim 14, wherein the power supply comprises a flyback topology.

16. The power supply of claim 14, wherein the output signal estimation circuit estimates the determined output current delivered to a reference load by determining a ratio of a discharge time of a secondary winding of a transformer of the power supply to a length of time of a cycle of the PWM generator when the reference load is coupled to the power supply.

17. The power supply of claim 14, wherein the power supply further comprises:

the semiconductor switch, wherein the semiconductor switch includes a control node coupled to the output driving circuit; and a transformer having a primary winding coupled to an output of the semiconductor switch, and a secondary winding coupled to the output node of the power supply.

18. The power supply of claim 17, wherein:

the controller further comprises a zero-crossing detection circuit; and the transformer further comprises a second secondary winding having an output coupled to the zero-crossing detection circuit.

19. The power supply of claim 18, wherein the output signal estimation circuit further determines the output current based on an output of the zero-crossing detection circuit.

20. The power supply of claim 14, wherein the output signal estimation circuit is further configured to determine a second derivative of the determined output current of the power supply with respect to a setting of the voltage control signal.

* * * * *